United States Patent
Lee et al.

(10) Patent No.: US 12,449,777 B2
(45) Date of Patent: Oct. 21, 2025

(54) SYSTEM FOR DISAGGREGATING POWER CONSUMPTION

(71) Applicant: Encored Technologies, Inc., Seoul (KR)

(72) Inventors: Hyo Seop Lee, Seoul (KR); Jae Ryun Yim, Seoul (KR)

(73) Assignee: Encored Technologies, Inc., Seoul (KR)

( * ) Notice: Subject to any disclaimer, the term of this patent is extended or adjusted under 35 U.S.C. 154(b) by 499 days.

(21) Appl. No.: 17/735,873

(22) Filed: May 3, 2022

(65) Prior Publication Data

US 2023/0297049 A1    Sep. 21, 2023

(30) Foreign Application Priority Data

Mar. 18, 2022    (KR) .............. 10-22-0033897

(51) Int. Cl.
| | | |
|---|---|---|
| G05B 19/04 | (2006.01) | |
| G01R 22/10 | (2006.01) | |
| G05B 19/042 | (2006.01) | |
| G06F 17/18 | (2006.01) | |
| G06F 119/06 | (2020.01) | |

(52) U.S. Cl.
CPC .......... *G05B 19/042* (2013.01); *G01R 22/10* (2013.01); *G06F 17/18* (2013.01); *G01D 2204/24* (2021.05); *G05B 2219/2639* (2013.01); *G06F 2119/06* (2020.01)

(58) Field of Classification Search
CPC .......... G05B 19/042; G05B 2219/2639; G01R 22/10; G06F 17/18; G06F 2119/06; G01D 2204/24
See application file for complete search history.

(56) References Cited

U.S. PATENT DOCUMENTS

| | | | |
|---|---|---|---|
| 10,983,496 B1 * | 4/2021 | Aljohani ............ | G05B 19/0428 |
| 2023/0228446 A1 * | 7/2023 | Lee ...................... | G05B 19/042 |
| | | | 700/276 |

* cited by examiner

*Primary Examiner* — Aditya S Bhat
(74) *Attorney, Agent, or Firm* — Quantum Patent Law Firm; Seongyoune Kang

(57) ABSTRACT

A power consumption disaggregation system according to an embodiment of the present invention comprises: a DB for receiving power data from a smart meter installed in a house, receiving data according to external factors affecting the power data from an external server, and storing the data in time series; an extraction unit for extracting a characteristic variable of a reference resolution time interval from the power data and the data according to external factors stored in time series; and an analysis unit for disaggregating total power consumption in the house by inferring a hidden power consumption state by inputting the characteristic variable into a power consumption disaggregation model based on a Hidden Markov Model (HMM) considering dependency of external factors.

14 Claims, 5 Drawing Sheets

SYSTEM FOR DISAGGREGATING POWER CONSUMPTION

CROSS-REFERENCE TO RELATED APPLICATION

This application claims priority to Korean Patent Application No. 10-2022-0033897, filed Mar. 18, 2022, which is incorporated by reference herein in its entirety.

BACKGROUND OF THE INVENTION

This invention was financially supported by the Ministry of Trade, Industry and Energy (MOTIE) and Korea Institute for Advancement of Technology (KIAT) through the International Cooperative R&D program (Project No. 1415177635).

Field of the Invention

The present invention relates to a power consumption disaggregation system based on non-intrusive load monitoring (NILM), and more specifically, to a power consumption disaggregation system which can disaggregate total power consumption in a house into power consumption of each hidden power consumption state by extracting characteristic variables based on a reference resolution (low resolution) from power data based on a high resolution and applying the characteristic variables to a power consumption disaggregation model based on a Hidden Markov Model (HMM) considering dependency of external factors.

Background of the Related Art

In order to reduce and intelligently control energy consumption, it is necessary to know power consumption and amount of consumed power of energy consuming devices and use status of the devices. However, as only consumer's total amount of energy consumption (accumulated power) can be known in a general home through a distribution panel, it is unknown which device is used with only this information.

Accordingly, although there is a method of monitoring each energy consuming device by installing a smart plug, the unit price of the smart plug is relatively high and thus generates a cost problem.

To solve this problem, researches on Non-Intrusive Load Monitoring (NILM) based on a total amount of power consumption are under progress recently. NILM is a software approach of efficiently extracting energy consumption information of individual load devices through cooperation of a single measurement device at a power entry point and a server, and the energy consumption information of individual load devices may be extracted from total energy consumption information in a method of collecting various data such as current, voltage, power and the like by the single measurement device (smart meter), and analyzing and collecting related data by the server.

Generally, KEPCO's 15-minute unit is used as a time resolution for collecting power data. Although it is scalable from the aspect of utilization when low-resolution power data of 15-minute unit is used, there is a limit in providing information on user's behaviors.

In addition, although high-resolution power data may provide information on detailed user's behaviors of power consumption by expressing changes in the amount of power consumption, installation of additional measurement devices is required, and collection intervals and formats may vary according to installed measurement devices.

Accordingly, a power consumption disaggregation system based on NILM, which can improve performance while increasing utilization of high-resolution power data by converting the collection intervals and formats of multi-resolution power data based on low-resolution power data, is required.

In addition, Intrusive Load Monitoring has a disadvantage in that the identification rate of an energy consuming device is inaccurate. Accordingly, a system capable of grasping a hidden power consumption state considering factors that affect consumption of power is required.

SUMMARY OF THE INVENTION

Therefore, the present invention has been made in view of the above problems, and it is an object of the present invention to provide a power consumption disaggregation system, which can improve utilization and analysis performance by extracting characteristic variables based on a reference resolution (low resolution) from power data based on a high resolution and using the characteristic variables for analysis of power consumption disaggregation.

In addition, another object of the present invention is to provide a power consumption disaggregation system, which can disaggregate total power consumption in a house into power consumption of each hidden power consumption state by applying a characteristic variable based on a reference resolution to a power consumption disaggregation model based on a Hidden Markov Model (HMM) considering dependency of external factors (temperature, time of day, and the like).

To accomplish the above objects, according to one aspect of the present invention, there is provided a power consumption disaggregation system comprising: a database (DB) for receiving power data from a smart meter installed in a house, receiving data according to external factors affecting the power data from an external server, and storing the data in time series; an extraction unit for extracting a characteristic variable of a reference resolution time interval from the power data and the data according to external factors stored in time series; and an analysis unit for disaggregating total power consumption in the house by inferring a hidden power consumption state by inputting the characteristic variable into a power consumption disaggregation model based on a Hidden Markov Model (HMM) considering dependency of external factors.

In addition, the power consumption disaggregation model based on a Hidden Markov Model (HMM) considering dependency of external factors includes, in a reference resolution time interval section, an emission part including a normal distribution including an average and a variance of observation values that can be generated for each power consumption state considering dependency of external factors; and a transition part including a transition probability matrix for determining transition of a power consumption state considering dependency of external factors. At this point, the observation value becomes the total power consumption of the house.

In addition, the power consumption disaggregation model may infer a time series of the hidden power consumption state by using a time series of observation values up to a current time point t on the basis of the normal distribution and the transition probability matrix considering dependency of external factors.

In addition, the hidden power consumption state may be one among a base state in which base power consumption occurs without intervention of a user activity, an activity state in which power consumption occurs by intervention of a human activity without dependency of external factors, and a variable dependent state in which power consumption occurs by intervention of a human activity with dependency of external factors.

At this point, when the hidden power consumption state is inferred as the base state, the analysis unit may determine that total power consumption observed at the current time point t is power consumption of a base load.

Alternatively, when the hidden power consumption state is inferred as the activity state, the analysis unit may disaggregate power consumption up to an average corresponding to the base state, among the total power consumption observed at the current time point t, as power consumption of a base load, and remaining power consumption as power consumption of an activity load.

Alternatively, when the hidden power consumption state is inferred as the variable dependent state, the analysis unit may disaggregate power consumption up to an average corresponding to the base state, among the total power consumption observed at the current time point t, as power consumption of a base load, power consumption up to an average corresponding to the activity state, among the remaining power consumption, as power consumption of an activity load, and remaining power consumption as power consumption of a variable dependent load.

Alternatively, the emission part may observe a normal distribution $\mathcal{N}(\mu_t^j, (\sigma^2)^j)$ having the average $\mu_t^j$ and the variance $(\sigma^2)^j$ that depend on an external variable $T_t$ representing the external factor on the basis of equation $x_t|S_t=j, T_t \sim \mathcal{N}(\mu_t^j, (\sigma^2)^j)$.

Here, the average $\mu_t^j$ is $\mu_t^j = \beta_0^t$ when dependency of the external variable is not considered and $\mu_t^j = B_0^j + \beta_1^j T_t$ when dependency of the external variable is considered, or may be calculated through an artificial neural network.

Here, t may be a time-series time step according to the reference resolution time interval, $X_t$ may be total power consumption observed at t, $S_t$ may be a hidden power consumption state that is not observed at t, $T_t$ may be an external variable, j may be a possible power consumption state, and $\mu_t^j$ and $(\sigma^2)^j$ may be the average $\mu_t^j$ and variance $(\sigma^2)^j$ of the total power consumption in state j at time point t.

In addition, in the artificial neural network, input data may be an external variable $T_t$ at time point t, and output data may be the average parameter $\mu_t^j$.

In addition, when dependency of the external variable is considered, the emission part may use only the external variable $T_t$ within a preset effective range as valid data.

In addition, the transition part may calculate the transition probability matrix according to whether it is dependent on external variables, and determine a power consumption state having a highest transition probability as a power consumption state to be transited.

At this point, the transition part may calculate the transition probability on the basis of $$P(S_{t+1}=i|S_t=j, T_t) = \frac{\gamma_0^{i,j}}{\sum_k \gamma_0^{k,j}}$$

when dependency of the external variable is not considered.

Alternatively, the transition part may calculate the transition probability on the basis of $$P(S_{t+1}=i|S_t=j, T_t) = \frac{\exp(\gamma_0^{i,j} + \gamma_1^{i,j} T_t)}{\sum_k \exp(\gamma_0^{k,j} + \gamma_1^{k,j} T_t)}$$

or through an artificial neural network when dependency of the external variable is considered.

Here, t may be a time-series time step according to the reference resolution time interval, $S_t$ may be a hidden power consumption state that is not observed at t, i, j, and k may be possible power consumption states, and $T_t$ may be an external variable.

In addition, in the artificial neural network, input data is an external variable $T_t$ at time point t, and output data may be the transition probability matrix.

In addition, when the power data or the data according to the external factor is resolution data higher than the reference resolution, the extraction unit may extract a dimension-reduced characteristic variable based on the reference resolution using an autoencoder.

In addition, the analysis unit may determine an optimal model parameter of the power consumption disaggregation model by learning the characteristic variable extracted by the extraction unit and the observed total power consumption as learning data on the basis of an expectation-maximization algorithm.

In addition, the analysis unit may infer a hidden power consumption state for the total power consumption at each time point t on the basis of the power consumption disaggregation model of which the optimal model parameter is determined, and disaggregate the total power consumption in the house into consumption of a load related to each power consumption state.

Other details of the embodiment are included in the detailed descriptions and drawings.

Therefore, according to the present invention, the power consumption disaggregation system of the present invention may increase utilization scalability of multi-resolution data (high resolution/low resolution) by extracting characteristic variables based on a reference resolution (low resolution) from power data based on a high resolution and using the characteristic variables for analysis.

That is, although power data received for disaggregation of total power consumption in each house and external factor data are collected at different resolutions of high-resolution or low-resolution time units, as the data are converted into low-resolution (e.g., KEPCO's data collection resolution of 15-minute time unit) data having scalability, multi-resolution data can be used.

In addition, total power consumption in a house can be disaggregated into power consumption of each hidden power consumption state through a power consumption disaggregation model based on a Hidden Markov Model (HMM) considering dependency of external factors (temperature, time of day, and the like).

Therefore, power consumption information obtained by disaggregating power consumption may be provided to a corresponding user terminal. In addition, the power consumption information may be used as basic data for constructing a power consumption solution service or the like required for each house.

The effects according to the invention are not limited by the contents exemplified above, and more various effects are included in the present specification.

This invention was financially supported by the Ministry of Trade, Industry and Energy (MOTIE) and Korea Institute for Advancement of Technology (KIAT) through the International Cooperative R&D program. (Project No. 1415177635)

DETAILED DESCRIPTION OF THE PREFERRED EMBODIMENT

The following description merely illustrates the principles of the invention. Therefore, those skilled in the art may implement the principles of the invention although they are not explicitly described or shown in this specification and invent various devices included in the spirit and scope of the invention. In addition, it should be understood that in principle, all the conditional terms and embodiments listed herein are clearly intended only for the purpose of understanding the concept of the inventive, and are not limited to the embodiments and states specially listed as described above.

In addition, in the following description, it should be understood that ordinal expressions such as first, second, and the like are intended to describe objects that are equal to and independent from each other, and there is no meaning of main/sub or master/slave in the order thereof.

The above objects, features and advantages will become more apparent through the following detailed description in relation to the accompanying drawings, and accordingly, those skilled in the art may easily embody the technical spirit of the invention.

The features of the various embodiments of the present invention may be partially or wholly coupled to or combined with each other, and as those skilled in the art will fully understand, technically various interconnections and operations are possible, and each embodiment may be implemented to be independent from the others, or the embodiments may be implemented together in association with each other.

Figure 1:
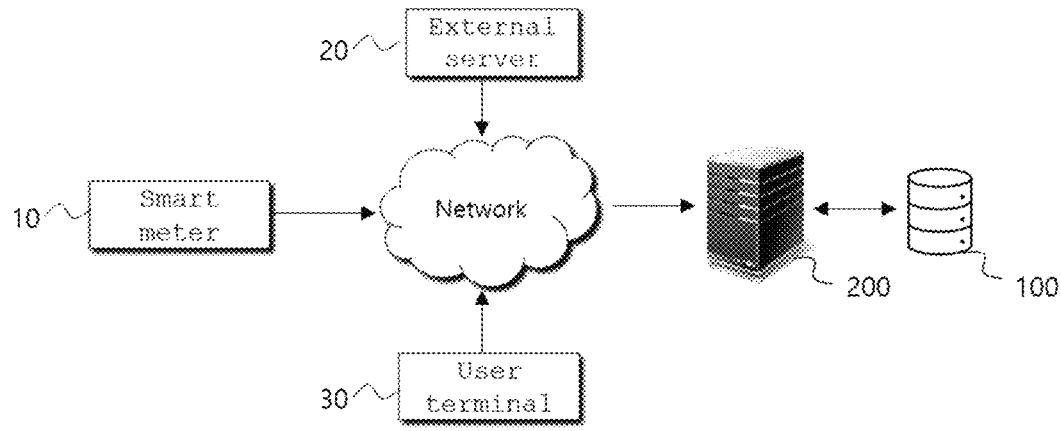
FIG. 1 is a view showing the overall configuration of a power consumption disaggregation system according to an embodiment of the present invention.
Figure 2:
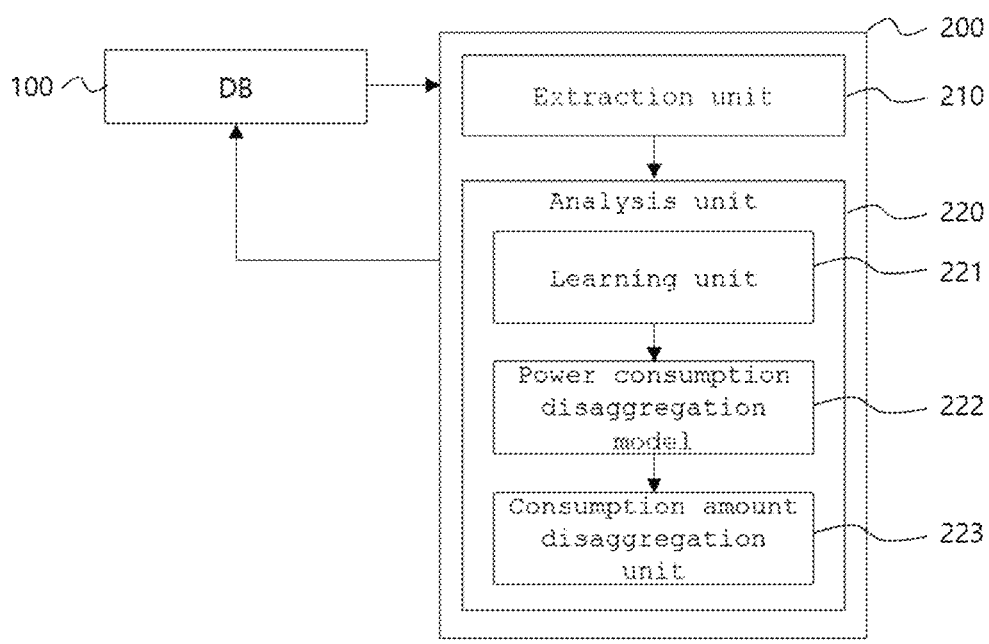
FIG. 2 is a block diagram showing a schematic configuration of the power consumption disaggregation system of FIG. 1.

FIG. 1 is a view showing the overall configuration of a power consumption disaggregation system according to an embodiment of the present invention. FIG. 2 is a block diagram showing a schematic configuration of the power consumption disaggregation system of FIG. 1.

Referring to FIGS. 1 and 2, a power consumption disaggregation system of the present invention may include a database 100 and a power management server 200. The power management server 200 may include an extraction unit 210 and an analysis unit 220.

Figure 3:
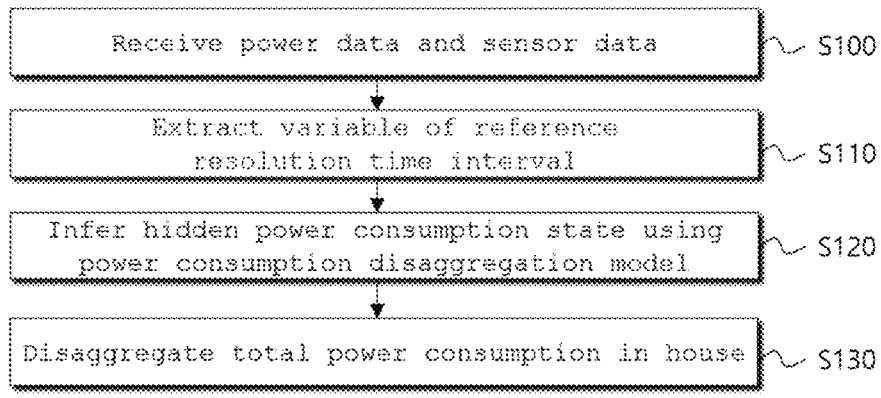
FIG. 3 is a flowchart illustrating a power consumption disaggregation method according to an embodiment of the present invention.

The analysis unit 220 may include a learning unit 221, a power consumption disaggregation model 222, and a consumption amount disaggregation unit 223. In addition, FIG. 3 is a flowchart illustrating a power consumption disaggregation method according to an embodiment of the present invention.

The database 100 may receive power data from a smart meter 10 installed in a house, receive data according to external factors affecting the power data in the house from an external server 20, and store the data in time series (S100).

At this point, the received power data may be collected as high-resolution data or low-resolution data according to data collection intervals of the smart meter 10.

At this point, the received power data may be collected as high-resolution data or low-resolution data according to data collection intervals of the smart meter 100.

Here, the low-resolution data may have a 15-minute resolution according to a general collection interval, and may be used as a reference resolution in the present invention.

The high-resolution data may have a temporal resolution higher than the reference resolution, for example, 1-minute resolution, several-second (Sec) resolution, or the like.

In addition, power data collected at high-resolution or low-resolution time intervals may be power signal information including multi-dimensional power consumption characteristics such as active power and reactive power, voltage, current, normal or transient state, transient response, on/off event, state transition change information, and the like.

The data according to external factors affecting the power data may be data received from the external server 20 or data included in the power data. For example, the external factors affecting the power data may be various factors such as temperature, humidity, fine dust, time of day, season, and the like. When the external factors are temperature, humidity, fine dust, and the like, the external server 20 may be a server of the Korea Meteorological Administration. On the other hand, the data according to external factors may be received from a corresponding smart meter without the external server 20.

The extraction unit 210 may extract characteristic variables of a reference resolution time interval from the power data and the data according to external factors stored in the database 100 in time series (S110).

When the power data and the data according to external factors are resolution data higher than the reference resolution, the extraction unit 210 may extract dimension-reduced characteristic variables based on the reference resolution using an autoencoder. It will be described in detail with reference to FIGS. 4 and 5.

Figure 4:
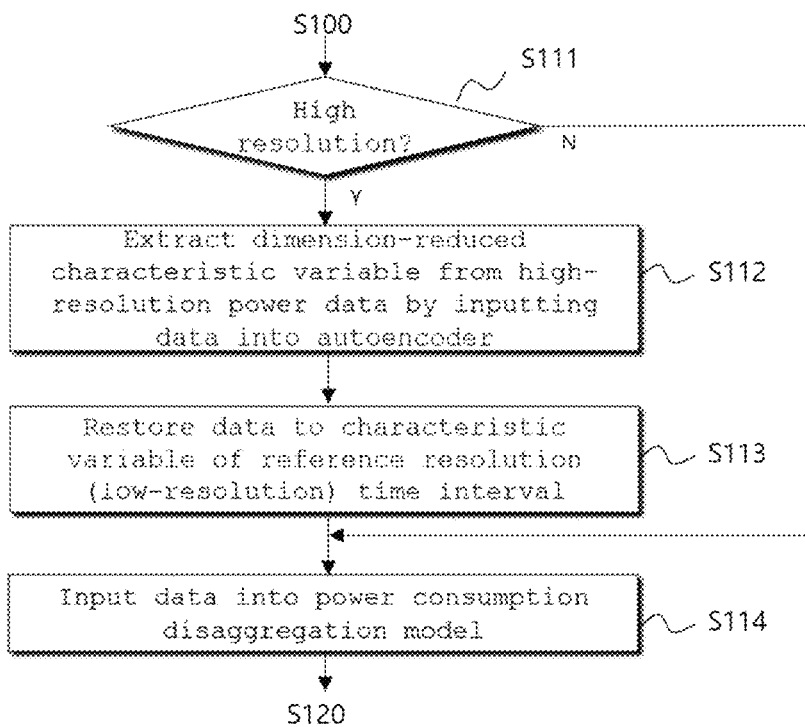
FIG. 4 is a flowchart illustrating S110 (extraction of characteristic variables of a reference resolution time interval) of FIG. 3.
Figure 5:
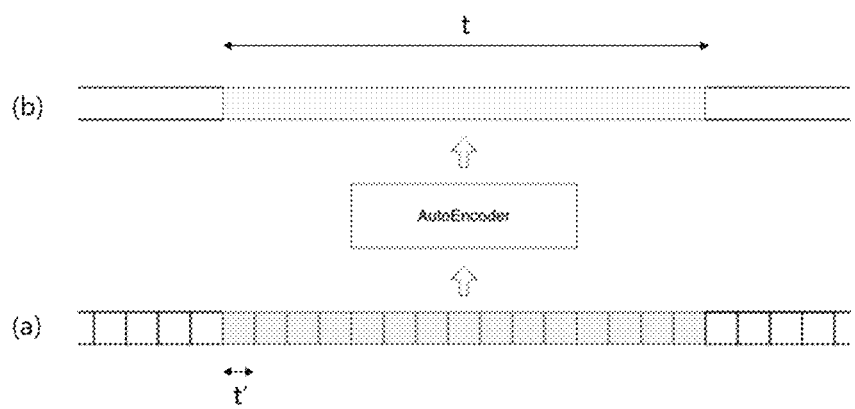
FIG. 5 is a view for explaining extraction of characteristic variables by the extraction unit of FIG. 2.

FIG. 4 is a flowchart illustrating S110 (extraction of characteristic variables of a reference resolution time interval) of FIG. 3. FIG. 5 is a view for explaining extraction of characteristic variables by the extraction unit of FIG. 2.

Referring to FIG. 4, when the power data or the data according to external factors is a data having a resolution higher than the reference resolution at step S110 (S111, Y), the dimension-reduced characteristic variables may be extracted from the high-resolution data using an autoencoder (S112). On the other hand, when the power data or the data according to external factors is a low-resolution data (S111, N), the low-resolution data may be used as it is.

Next, the data may be restored to the characteristic variables of the reference resolution time interval (S113).

For example, when high-resolution data (collection interval is t, for example, 1-minute time interval) as shown in FIG. 5(a) is input into the extraction unit 210 constructed as an artificial neural network based on an autoencoder, the extraction unit 210 may convert the power data and the data according to external factors into reference resolution data (low-resolution, collection interval is t, for example, 15-minute time interval) as shown in FIG. 5 (b) by reducing the dimension through an autoencoder method.

Here, the autoencoder is an unsupervised learning model having a symmetrical structure, may be configured of an encoder for compressing an input and a decoder for decompressing an output, and performs an operation of extracting dimension-reduced characteristic variables through the encoder and producing an output similar to the input through the decoder.

The input of the artificial neural network based on an autoencoder of the present invention may be a high-resolution time interval characteristic corresponding to a single low-resolution time interval section, and the output may be an encoding result corresponding to a corresponding low-resolution time interval section.

As multi-resolution data is converted into a reference resolution data through an artificial neural network based on an autoencoder and input into the power consumption disaggregation model of the present invention, the multi-resolution data may be used for power consumption disaggregation (S114).

Next, the analysis unit 220 may infer a hidden power consumption state using the power consumption disaggregation model 222 (S120). Specifically, the analysis unit 220 may disaggregate total power consumption in a house by inferring a hidden power consumption state by inputting the characteristic variables extracted by the extraction unit 210 into the power consumption disaggregation model 222 based on a Hidden Markov Model (HMM) considering dependency of external factors.

The analysis unit 220 may include a learning unit 221, a power consumption disaggregation model 222, and a consumption amount disaggregation unit 223. Here, the learning unit 221 may learn the characteristic variables extracted by the extraction unit 210 as learning data, and find an optimal parameter. At this point, the optimal parameter may be found through an expectation-maximization (EM) algorithm.

The expectation-maximization algorithm is an iterative algorithm that finds an estimate of a parameter having maximum likelihood or maximum a posteriori. Specifically, the expectation-maximization algorithm alternately applies an expectation step of calculating an expected value of log likelihood as an estimate of the parameter and a maximization step of obtaining parameter estimates that maximize the expected value, and the variable values calculated at the maximization step are used as estimates at a next expectation step.

The analysis unit 220 infers the hidden power consumption state from the total power consumption through the power consumption disaggregation model 222 that is learned as a model by the learning unit 221, i.e., having an optimal parameter, and based on this, the consumption amount disaggregation unit 223 may disaggregate the total power consumption in a house into power consumption of loads related to the inferred hidden power consumption state (S130).

Figure 6:
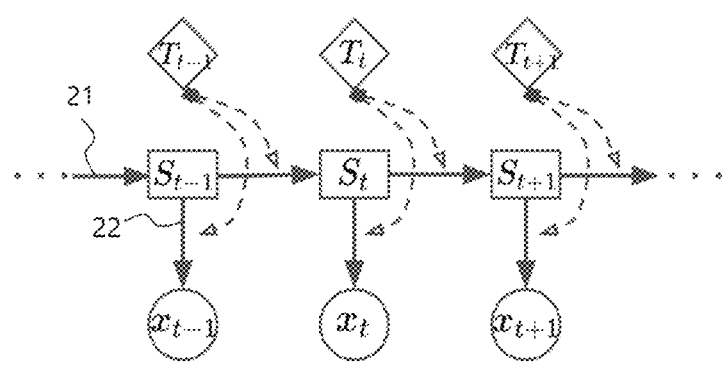
FIG. 6 is a view for explaining a power consumption disaggregation model according to an embodiment of the present invention.

At this point, the HMM-based power consumption disaggregation model 222 considering dependency of external factors of the present invention may be illustrated as a model as shown in FIG. 6. FIG. 6 is a view for explaining a power consumption disaggregation model according to an embodiment of the present invention.

Referring to FIG. 6, in the power consumption disaggregation model 222 based on a Hidden Markov Model (HMM) considering dependency of external factors, it is shown through the dotted arrows (dependency of external variables) that transition parts 21 (horizontal solid arrows) and external variables representing external factors affect emission parts 22 (vertical solid arrows). That is, the power consumption disaggregation model may include transition parts 21 and emission parts 22 as components.

Here, t is a time point (time-series time step according to reference resolution time interval), $x_t$ is an observation value expressed as $x_t \in \mathbb{R}$, which is the total power consumption observed at time point t, $s_t$ is a hidden state that is not observed at time point t and expressed as $s_t \in \{1, \ldots, K\}$, and $T_t$ may be at least one external variable at time point t. At this point, the external variable may be temperature, time, or the like as described above, and hereinafter, a case where the external variable (external factor) is temperature may be described as an example for understanding of explanation.

At this point, the hidden power consumption state may be classified into classes of, for example, K=3.

The hidden power consumption state may be classified into i) a base state in which base power consumption occurs without intervention of a user activity, ii) an activity state in which power consumption occurs by intervention of a human activity without dependency of external factors, and iii) a variable dependent state in which power consumption occurs by intervention of a human activity with dependency of external factors.

In FIG. 6, the emission part 22 may be a normal distribution having an average parameter depending on external variables, and the transition part 21 may be a state transition probability matrix depending on external variables.

Specifically, the emission part 22 includes a normal distribution including an average and a variance of observation values (total power consumption) that may occur for each power consumption state considering dependency of external factors, and may observe observation values in the form of a normal distribution.

The emission part 22 may observe a normal distribution having an average parameter on the basis of Equation 1 shown below. That is, hidden state j is considered as a state of consuming energy in one of $\{1, \ldots, K\}$, $T_t$ is temperature, which is an external factor recorded at time point t, and the amount of power consumption (observation value) in state j having a premise may be assumed as follows.

$$x_t | S_t = j, T_t \sim \mathcal{N}(\mu_t^j, (\sigma^2)^j) \qquad \text{[Equation 1]}$$

That is, the emission part 22 may observe a normal distribution $\mathcal{N}(\mu_t^j, (\sigma^2)^j)$ having an average $\mu_t^j$ and a variance $(\sigma^2)^j$ that depend on an external variable $T_t$ representing an external factor.

Here, when dependency of external variables is not considered, the average may be calculated as shown below in Equation 2.

$$\mu_t^j = \beta_0^j \qquad \text{[Equation 2]}$$

That is, $\beta_0^j$ is an average of base load power consumption without temperature dependency, and may be calculated as a constant value, and may be determined as an optimal value for each power consumption state through the learning unit 221.

In addition, t is a time-series time step according to the reference resolution time interval, $X_t$ is total power consumption observed at t, $S_t$ is a hidden power consumption state that is not observed at t, $T_t$ is an external variable, j is a possible power consumption state, and $\mu_t^j$ and $(\sigma^2)^j$ may be an average and a variance of the total power consumption in state j at time point t.

In addition, when dependency of external variables is considered, the average may be calculated as shown below in Equation 3. Alternatively, it may be calculated through an artificial neural network representing a non-linear relationship by extending the linear relationship of Equation 3.

$$\mu_t^j = \beta_0^j + \beta_1^j T_t \qquad \text{[Equation 3]}$$

Here, $\beta_1^j T_t$ is a rate of change of power consumption according to an external variable, i.e., change in external temperature, in state j, and may be calculated as a constant, and it can be found as an optimal value for each power consumption state through learning of the learning unit 221.

In addition, it is an artificial neural network structure representing a non-linear relationship by extending the linear relationship according to Equation 3, and may be expressed as follows.

$$\mu_t^j = \text{NeuralNetEmission}^j(T_t)$$

At this point, in the artificial neural network, the input data may be an external variable $T_t$ at time point t, and the output data may be the average parameter $\mu_t^j$.

Meanwhile, when dependency of external variables is considered, only the external variable $T_t$ within a preset effective range may be used as valid data. For example, when the external variable is temperature, a minimum temperature and a maximum temperature may be set and used as an effective range.

In addition, the transition part 21 may include a transition probability matrix for determining transition of a power consumption state considering dependency of external factors.

Here, the transition probability matrix is a rule in which one state at time point t changes to another state over time, and when K=3, it may have a 3×3 probability matrix, and each probability value of the matrix may be determined as an optimal parameter value learned by the learning unit 221. At this point, the probability value also changes according to change in the external variable.

Specifically, the transition part 21 may calculate the transition probability matrix using Equations 4 and 5 shown below according to dependency of external variables, and determine a power consumption state having the highest transition probability as a power consumption state to be transited next.

First, when external variable dependency is not considered, the transition probability as shown in Equation 4 may be calculated.

$$P(S_{t+1} = i | S_t = j, T_t) = \frac{\gamma_0^{i,j}}{\sum_k \gamma_0^{k,j}} \qquad \text{[Equation 4]}$$

Here, t is a time-series time step according to the reference resolution time interval, $S_t$ is a hidden power consumption state that is not observed at t, i, j, and k are indexes indicating possible power consumption states, and $T_t$ may be an external variable.

That is, $$\frac{\gamma_0^{i,j}}{\sum_k \gamma_0^{k,j}}$$

is in state j at time point t, and it becomes the probability of being converted to state i at time point t+1, and when K=3, the probability becomes 1 in the case of adding them in each state of i={1, 2, 3}.

Alternatively, when external variable dependency is considered, it may be calculated as a multinomial logistic regression relationship as shown in Equation 5, or it may be calculated as an artificial neural network structure that generalizes the multinomial logistic regression relationship.

$$P(S_{t+1} = i | S_t = j, T_t) = \frac{\exp(\gamma_0^{i,j} + \gamma_1^{i,j} T_t)}{\sum_k \exp(\gamma_0^{k,j} + \gamma_1^{k,j} T_t)} \qquad \text{[Equation 5]}$$

In addition, the artificial neural network structure based on the multinomial logistic regression relationship according to Equation 5 may be expressed as follows.

$$P(S_{t+1}=i|S_t=j,T_t) = \text{NeuralNetTransition}^{ij}(T_t)$$

At this point, in the artificial neural network, the input data may be an external variable $T_t$ at time point t, and the output data may be a transition probability matrix based on the multinomial logistic regression relationship.

The consumption amount disaggregation unit 223 may infer a hidden state that best explains the observed total power consumption using a Viterbi algorithm (S120), and may disaggregate power consumption of each power consumption state from the hidden state inferred for each time point and the total power consumption (S130).

That is, the consumption amount disaggregation unit 223 may infer the hidden state $S_t$ using the observation value $X_t$ at the current time point t considering dependency of external factors on the basis of a normal distribution through the emission part 22, and infer power consumption state $S_{t+1}$ to be transited at the next time point t+1 on the basis of the transition probability matrix through the transition part.

Figure 7:
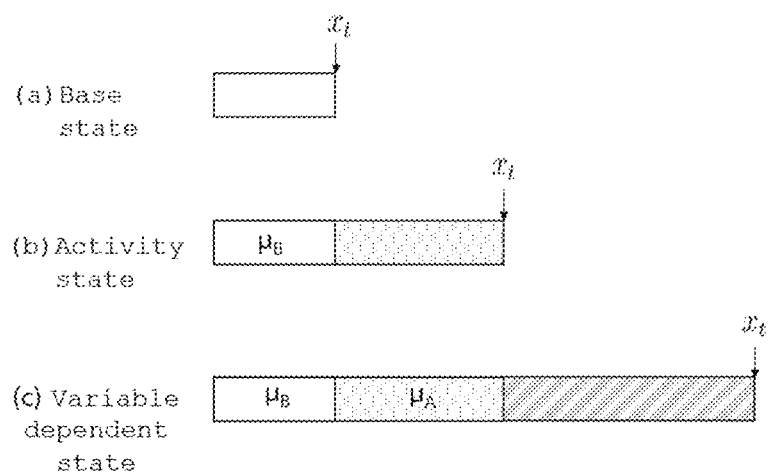
FIG. 7 is a view for explaining power consumption disaggregation of the analysis unit of FIG. 2.

FIG. 7 is a view for explaining power consumption disaggregation of the analysis unit of FIG. 2. Referring to FIG. 7, when the hidden state inferred through the power consumption disaggregation model 222 is inferred as the base state, the consumption amount disaggregation unit 223 may determine that all the total power consumption observed at the current time point t is power consumption of a base load.

Alternatively, when the hidden state inferred through the power consumption disaggregation model 222 is inferred as the activity state, the consumption amount disaggregation unit 223 may disaggregate power consumption up to the average $\mu_B$ corresponding to the base state, among the total power consumption observed at the current time point t, as power consumption of the base load, and disaggregate remaining power consumption as power consumption of the activity load.

Alternatively, when the hidden state inferred through the power consumption disaggregation model 222 is inferred as the variable dependent state, the consumption amount disaggregation unit 223 may disaggregate power consumption up to the average $\mu_B$ corresponding to the base state, among the total power consumption $X_t$ observed at the current time point t, as power consumption of the base load, power consumption up to the average $\mu_A$ corresponding to the activity state, among the remaining power consumption, as power consumption of the activity load, and remaining power consumption as power consumption of the variable dependent load.

Figure 8:
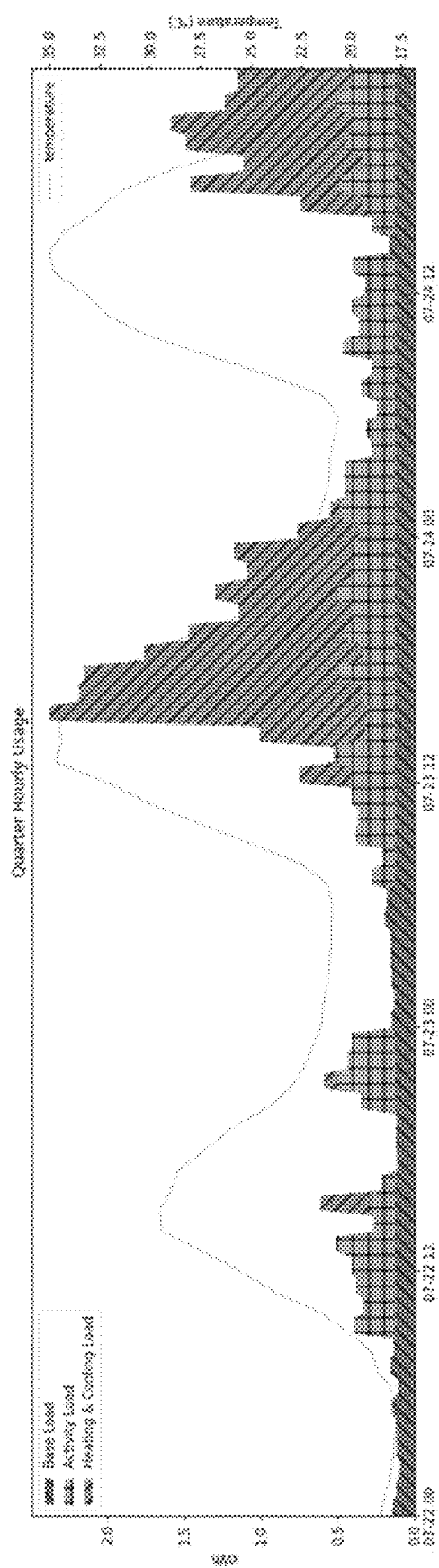
FIG. 8 is a graph for explaining power consumption disaggregation according to an embodiment of the present invention.

The consumption amount disaggregation unit 223 may derive an in-house power consumption pattern as shown in FIG. 8 by disaggregating the power consumption state according to dependency of external variables in each house.

FIG. 8 is a graph for explaining power consumption disaggregation according to an embodiment of the present invention. In FIG. 8, temperature is applied as an external variable. Referring to FIG. 8, and the power consumption state can be confirmed by classifying total power consumption in a house considering temperature dependency into a base load, an activity load, and a temperature dependent load (Heating & Cooling load). Based on the power consumption pattern of each house, users having similar patterns can be classified as similar users and used as basic service data. For example, in the power consumption disaggregation model of the present invention, the normal distribution representing the output is a linear relationship with respect to temperature, and Equation 2 considers temperature dependency. Here, it can be determined that the higher the temperature dependency, the worse the efficiency. Accordingly, solutions such as preventive maintenance, recommendation of new home appliances, and the like may be provided as a service required for a corresponding group by classifying a user group having high temperature dependency.

As described above, the power consumption disaggregation system according to an embodiment of the present invention is a system based on Non-Intrusive Load Monitoring (NILM), and may provide a corresponding user terminal 30 with power consumption information obtained by disaggregating power consumption (total amount of power consumption) in each house for each power consumption state considering dependency of external variables by using data received from the smart meter 10 installed in each house and received from at least one external server 20.

In addition, the system of the present invention may classify users by using power consumption information disaggregated for each house, construct a power consumption solution service or the like for each classified user group, and provide the service to a corresponding user terminal 30.

Although the embodiments of the present invention have been described in more detail with reference to the accompanying drawings, the present invention is not necessarily limited to these embodiments, and various modifications may be made within the scope without departing from the technical spirit of the present invention. Therefore, the embodiments disclosed in the present invention are not intended to limit but to explain the technical spirit of the present invention, and the scope of the technical spirit of the present invention is not limited by these embodiments. Therefore, it should be understood that the embodiments described above are illustrative in all respects and not restrictive. The protection scope of the present invention should be construed by the following claims, and all technical ideas within the scope equivalent thereto should be construed as being included in the scope of the present invention.

DESCRIPTION OF SYMBOLS

100: database
200: Power management server
210: Extraction unit
220: Analysis unit
221: Learning unit
222: Power consumption disaggregation model
21: Emission part            22: Transition part
223: Consumption amount disaggregation unit
10: Smart meter              20: External server

What is claimed is:

1. A power consumption disaggregation system for disaggregating multi-resolution data comprising:
   a database configured to receive power data from a smart meter installed in a house, receive data according to external factors affecting the power data from an external server, and store the data in time series;
   an extraction unit configured to extract a characteristic variable of a reference low resolution time interval from the power data and the data according to external factors stored in time series;
   an analysis unit configured to disaggregate total power consumption in the house by inferring a hidden power consumption state by inputting the characteristic variable into a power consumption disaggregation model based on a Hidden Markov Model (HMM) considering dependency of external factors; and
   a communication unit configured to provide power consumption solution service to a user based on disaggregated power consumption information to be used to control energy consumption for a house in order to reduce power consumption,
   wherein the power consumption disaggregation model based on a Hidden Markov Model (HMM) considering dependency of external factors includes, in a reference low resolution time interval section:
      an emission part including a normal distribution including an average and a variance of observation values that can be generated for each power consumption state considering dependency of external factors; and
      a transition part including a transition probability matrix for determining transition of a power consumption state considering dependency of external factors, wherein the observation value becomes the total power consumption of the house, and
   wherein the power consumption disaggregation system is configured to enhance utilization scalability of multi-resolution data by allowing both high-resolution data and low-resolution data to be fed to the power consumption disaggregation system.

2. The system according to claim 1, wherein the power consumption disaggregation model is configured to infer a time series of the hidden power consumption state by using a time series of observation values up to a current time point t on the basis of the normal distribution and the transition probability matrix considering dependency of external factors.

3. The system according to claim 2, wherein the hidden power consumption state is one among a base state in which base power consumption occurs without intervention of a user activity, an activity state in which power consumption occurs by intervention of a human activity without dependency of external factors, and a variable dependent state in which power consumption occurs by intervention of a human activity with dependency of external factors.

4. The system according to claim 3, wherein when the hidden power consumption state is inferred as the base state, the analysis unit is configured to determine that total power consumption observed at the current time point t is power consumption of a base load.

5. The system according to claim 3, wherein when the hidden power consumption state is inferred as the activity state, the analysis unit is configured to disaggregate power consumption up to an average corresponding to the base state, among the total power consumption observed at the current time point t, as power consumption of a base load, and remaining power consumption as power consumption of an activity load.

6. The system according to claim 3, wherein when the hidden power consumption state is inferred as the variable dependent state, the analysis unit is configured to disaggregate power consumption up to an average corresponding to the base state, among the total power consumption observed at the current time point t, as power consumption of a base load, power consumption up to an average corresponding to the activity state, among the remaining power consumption, as power consumption of an activity load, and remaining power consumption as power consumption of a variable dependent load.

7. The system according to claim 2, wherein the emission part is configured to observe a normal distribution $N(\mu_t^j, (\sigma^2)^j)$ having the average $\mu_t^j$ and the variance $(\sigma^2)^j$ that depend on an external variable $T_t$ representing the external factor on the basis of equation $x_t|S_t=j, T_t \sim N(\mu_t^j, (\sigma^2)^j)$, and the average $\mu_t^j$ is $\mu_t^j=\beta_0^j$ when dependency of the external variable is not considered and $\mu_t^j=\beta_0^j+\beta_1^j T_t$ when dependency of the external variable is considered, or is calculated through an artificial neural network, wherein t is a time-series time step according to the reference low resolution time interval, $X_t$ is total power consumption observed at t, $S_t$ is a hidden power consumption state that is not observed at t, $T_t$ is an external variable, j is a possible power consumption state, and $\mu_t^j$ and $(\sigma^2)$ are the average $\mu_t^j$ and variance $(\sigma^2)^j$ of the total power consumption in state j at time point t.

8. The system according to claim 7, wherein in the artificial neural network, input data is an external variable $T_t$ at time point t, and output data is the average $\mu_t^j$.

9. The system according to claim 7, wherein when dependency of the external variable is considered, the emission part is configured to use only the external variable $T_t$ within a preset effective range as valid data.

10. The system according to claim 2, wherein the transition part is configured to calculate the transition probability matrix according to whether it is dependent on external variables, to determine a power consumption state having a highest transition probability as a power consumption state to be transited, to calculate the transition probability on the basis of $$P(S_{t+1}=i|S_t=j, T_t) = \frac{\gamma_0^{i,j}}{\sum_k \gamma_0^{k,j}}$$

when dependency of the external variable is not considered, and to calculate the transition probability on the basis of $$P(S_{t+1}=i|S_t=j, T_t) = \frac{\exp(\gamma_0^{i,j}+\gamma_1^{i,j}T_t)}{\sum_k \exp(\gamma_0^{k,j}+\gamma_1^{k,j}T_t)}$$

or through an artificial neural network when dependency of the external variable is considered, wherein t is a time-series time step according to the reference low resolution time interval, $S_t$ is a hidden power consumption state that is not observed at t, i, j, and k are possible power consumption states, and $T_t$ is an external variable.

11. The system according to claim 10, wherein in the artificial neural network, input data is an external variable $T_t$ at time point t, and output data is the transition probability matrix.

12. The system according to claim 1, wherein when the power data or the data according to the external factor is resolution data higher than the reference low resolution, the extraction unit is configured to extract a dimension-reduced characteristic variable based on the reference low resolution using an autoencoder.

13. The system according to claim 2, wherein the analysis unit is configured to determine an optimal model parameter of the power consumption disaggregation model by learning the characteristic variable extracted by the extraction unit and the observed total power consumption as learning data on the basis of an expectation-maximization algorithm.

14. The system according to claim 13, wherein the analysis unit is configured to infer a hidden power consumption state for the total power consumption at each time point t on the basis of the power consumption disaggregation model of which the optimal model parameter is determined, and is configured to disaggregate the total power consumption in the house into consumption of a load related to each power consumption state.

* * * * *